United States Patent
Schreiber

(10) Patent No.: US 8,256,327 B2
(45) Date of Patent: Sep. 4, 2012

(54) COAXIAL GEAR SET

(75) Inventor: Heiko Schreiber, Igersheim (DE)

(73) Assignee: Wittenstein AG, Igersheim (DE)

( * ) Notice: Subject to any disclaimer, the term of this patent is extended or adjusted under 35 U.S.C. 154(b) by 491 days.

(21) Appl. No.: 12/529,851

(22) PCT Filed: Mar. 5, 2008

(86) PCT No.: PCT/EP2008/001733
§ 371 (c)(1), (2), (4) Date: Nov. 5, 2009

(87) PCT Pub. No.: WO2008/107168
PCT Pub. Date: Sep. 12, 2008

(65) Prior Publication Data
US 2010/0077882 A1    Apr. 1, 2010

(30) Foreign Application Priority Data
Mar. 6, 2007 (DE) .......................... 10 2007 011 175

(51) Int. Cl.
*F16H 55/08* (2006.01)
*F16H 1/32* (2006.01)
(52) U.S. Cl. ................. 74/640; 74/22 R; 74/63

(58) Field of Classification Search .................. 74/22 R, 74/63, 457, 462, 640; 475/176, 177, 180
See application file for complete search history.

(56) References Cited

U.S. PATENT DOCUMENTS

| 1,909,117 | A | * | 5/1933 | Pigott | ............................. 74/462 |
| 2,048,688 | A | | 7/1936 | De Long | |
| 2,222,515 | A | * | 11/1940 | Pigott | ............................. 74/462 |
| 2,447,104 | A | | 8/1948 | Trbojevich | |
| 2005/0066769 | A1 | | 3/2005 | Kiyosawa | |

FOREIGN PATENT DOCUMENTS

| DE | 10 2006 042 786 | 3/2008 |
| FR | 755284 | 11/1933 |

* cited by examiner

*Primary Examiner* — William C Joyce
(74) *Attorney, Agent, or Firm* — Bachman & LaPointe, P.C.

(57) ABSTRACT

A coaxial gear set, in particular a hollow shaft gear set for industrial drive technology, having high power density, comprising a drive element (7), an element (3), and an output element, with a gear ratio and a transmission of a drive torque occurring between the drive element (7) and the output element via a plurality of radially movable tooth segments (5), an outer tooth flank contour (11.1, 11.2) of the tooth contour (6) of the tooth segments (5) and/or a flank contour (12.1, 12.2) of a gearing (13) of an inner gearing (15) of an internal wheel (1), relative to a gear axis (M), a tooth contour that allows surface contact in the engagement area comprising a logarithmic spiral.

11 Claims, 3 Drawing Sheets

COAXIAL GEAR SET

BACKGROUND OF THE INVENTION

The present invention relates to a coaxial gear set, in particular a hollow shaft gear set for industrial drive technology with a high power density, having a drive element, an element and an output element, a step-up ratio and a transmission of a drive moment taking place between the drive element and the output element via a plurality of radially movable tooth segments.

Conventional gear sets are known and customary in the marketplace in a wide variety of forms and embodiments. In a coaxial gear set, substantially a tooth segment is moved into an internal toothing system of an internal gear via a drive element which is provided with a contour, in order to produce a step-up ratio and to transmit a moment.

Here, the conventional symmetries between the tooth flanks of the tooth segment and the tooth geometry of the internal toothing system of an internal gear are selected in such a way that the tooth flanks of the tooth segments make contact with the internal toothing system of an internal gear in a linear manner.

It is a disadvantage of this that force and moments are transmitted merely via the linear contact.

As a result of this rolling linear contact between a tooth flank contour of the tooth segment and a contour of an internal toothing system of the internal gear, a high loading (pressing) with high wear is set, in particular in the case of very high forces.

The present invention is therefore based on the object of providing a coaxial gear set which eliminates the stated disadvantages and by way of which a transmission of high moments of radially movable tooth segments with respect to internal toothing systems of internal gears is to be improved with reduced wear.

SUMMARY OF THE INVENTION

The foregoing object is achieved by the fact that an outer tooth flank contour of the tooth contour of the tooth segments and/or a flank contour of a toothing system of an internal toothing system of an internal gear, in relation to a gear set axis, have/has a tooth contour which makes surface contact possible in the engagement region which is achieved by the embodiment as a logarithmic spiral.

It has proven particularly advantageous in the present invention that an outer contour of a tooth segment, in particular in the region of the tooth flanks, follows the contour of a logarithmic spiral. The logarithmic spiral denotes a curve which intersects all the rays emanating from the origin at the same angle α. Its course is defined by the formula $$r = e^{a\alpha}$$

where: $\tan \alpha = 1/a$.

Precisely the same contour is also selected as the contour of a toothing system, in particular an internal toothing system of the internal gear.

Here, full surface contact between one tooth flank contour of the tooth segment and the tooth flank contour of the toothing system is set in the engagement region of both tooth flanks of the tooth segment with the toothing system of the internal gear.

The geometry of the logarithmic spiral with full surface contact during the radial movement of the tooth segment into the internal toothing system of the internal gear ensures an optimum load distribution (pressure distribution), with the result that an optimum transmission of high moments is possible with wear which is as low as possible and, in particular, uniform.

As a result, the service life of a coaxial gear set of this type can be increased substantially, it being possible at the same time for very high moments to be transmitted. This ensures surface contact independently of the radius and size of the gear set.

Here, an angle α can be selected freely between 5° and 85°, preferably between 15° and 45°, by the corresponding function of the logarithmic spiral, with the result that different tooth flank geometries of the internal toothing system and of the tooth segments can also be influenced.

Independently of the radius, in the selection of a defined logarithmic spiral, coaxial gear sets of different size can then accordingly be produced with different diameters, in which one and the same tooth segment can be used. This is likewise a great advantage, since one and the same tooth segment can be used for coaxial gear sets of different size.

The adaptation of a correspondingly curved internal gear root fillet to the tip curve of the tooth segment can influence a jolt-free positively guided pushing back of the tooth segment if the latter runs through the tooth root of the internal toothing system of the internal gear. This provides a jolt-free transition between an up and down movement of the tooth segments.

BRIEF DESCRIPTION OF THE DRAWINGS

Further advantages, features and details of the invention result from the following description of preferred exemplary embodiments and using the drawing, in which.

DETAILED DESCRIPTION

Figure 1:
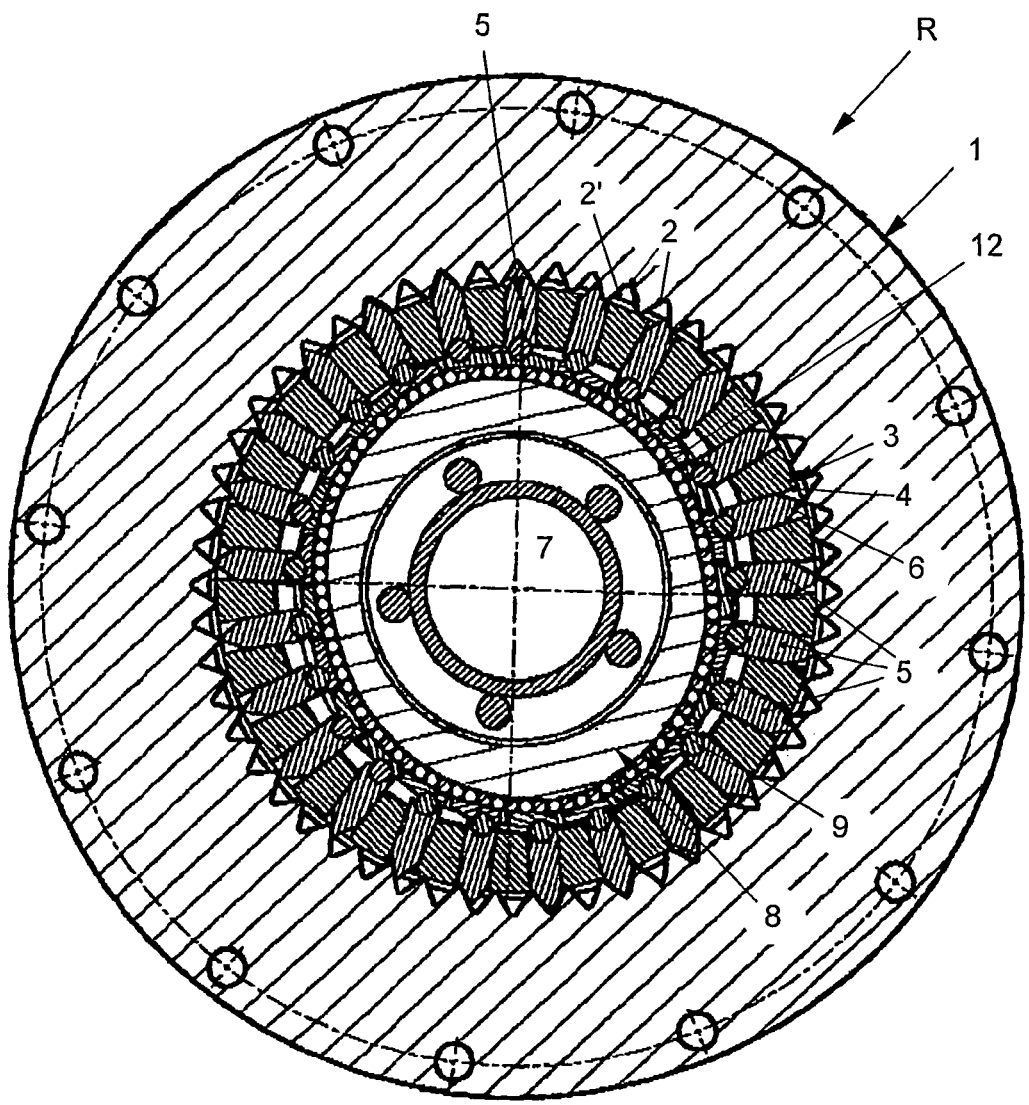
FIG. 1 shows a diagrammatically illustrated cross section through a coaxial gear set.

According to FIG. 1, a coaxial gear set R has an internal gear 1 which has a toothing system 2 which lies on the inside. An element 3, preferably configured as an output element, is inserted in a circularly annular manner within the internal gear 1, a plurality of tooth segments 5 which are inserted radially next to one another and into corresponding guides 4 being arranged in the circularly annular element 3. The tooth segments 5 are mounted such that they can be displaced radially to and fro within the guide 4 and have a tooth contour 6 or tooth flank contour at one end.

A drive element 7, configured as a shaft or as a hollow shaft, is provided within the element 3 with received tooth segments 5, which drive element 7 has an outer profiling 8 which can be of polygonal or lug-like configuration, for example with a contour 9, as an elevation.

A bearing (not shown in more detail here) is likewise provided between the outer contour 9 of the profiling 8 of the drive element 7 and the element 3, in particular the output element, or at one end of the tooth segments 5. Antifriction bearings, sliding bearings or the like which enclose the outer contour 9 of the profiling 8 of the drive element 7 can be used as the bearing.

Reference is made to German patent application DE 10 2006 042 786 with respect to the method of operation of the above-described coaxial gear set.

The present invention relates to a further development of the above-mentioned coaxial gear set.

Figure 2:
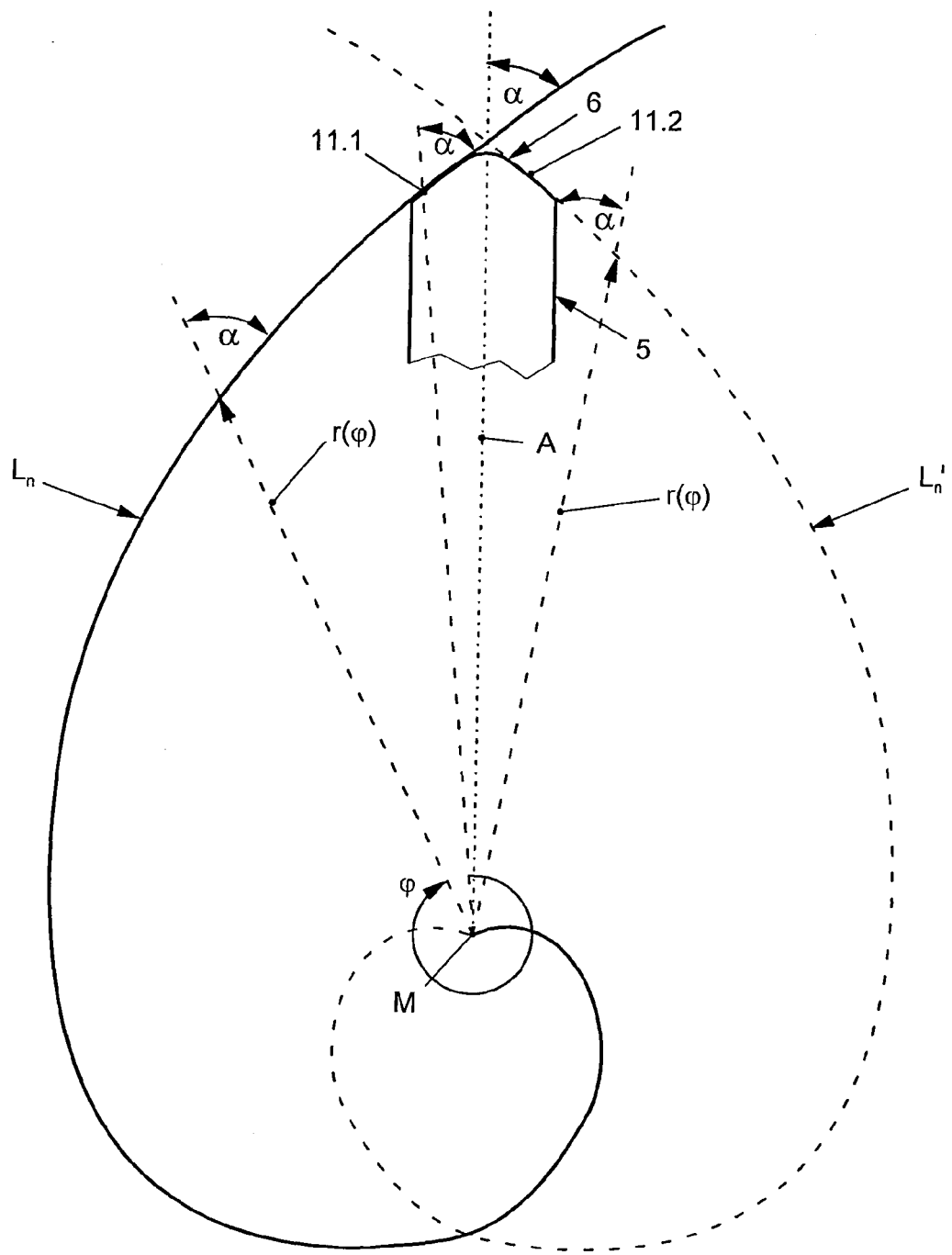
FIG. 2 shows a diagrammatically illustrated plan view of one embodiment of a contour of a tooth flank or a contour of an internal toothing system of an internal gear.
Figure 3:
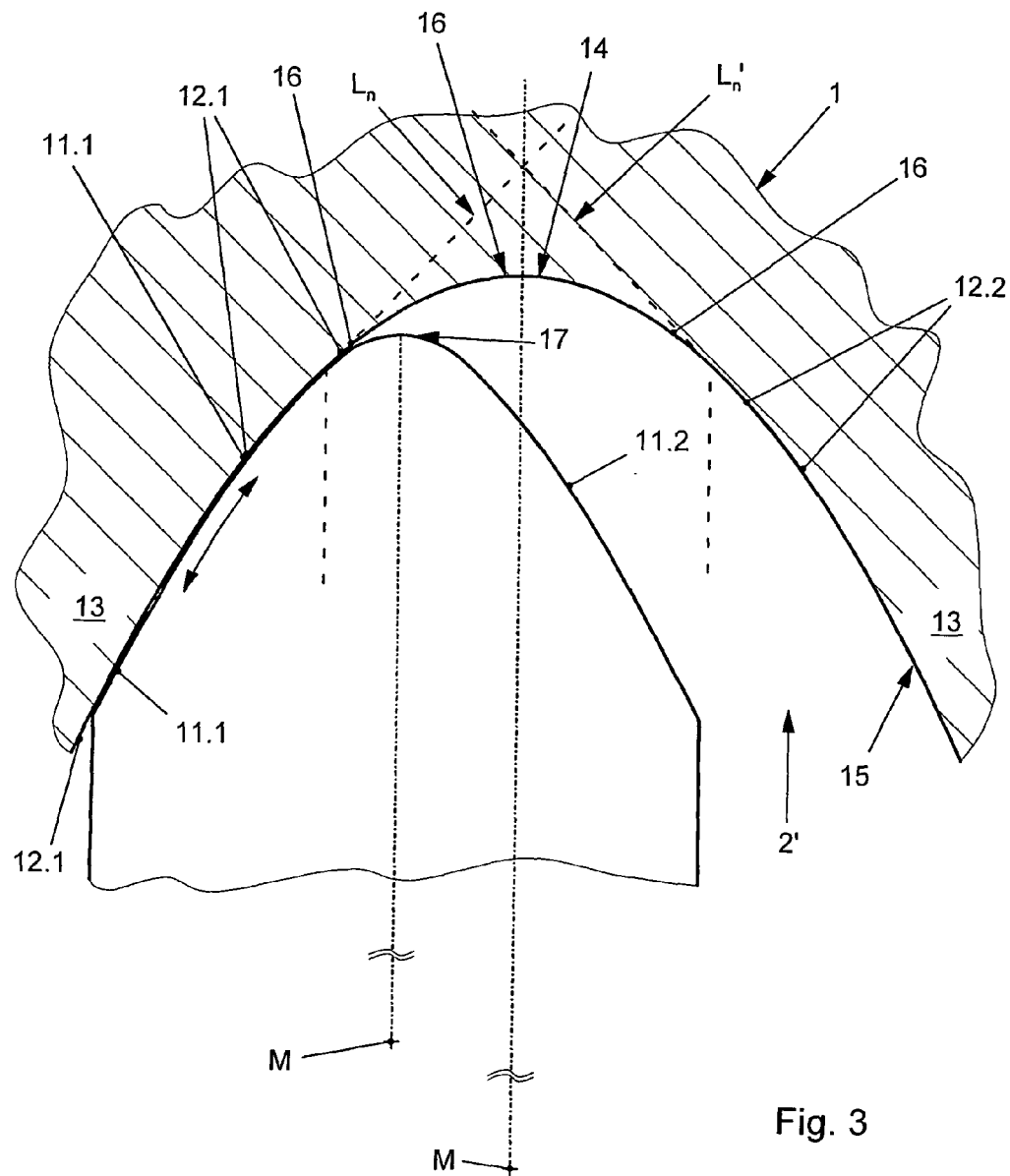
FIG. 3 shows a diagrammatically illustrated enlarged detail in the region between a contour of the internal toothing system of the internal gear and of a tooth segment.

According to FIG. 2, a diagrammatic illustration of a logarithmic spiral Ln is shown which originates from a gear set axis M of a coaxial gear set R. The logarithmic spiral Ln can be selected with any desired rising angle α.

It has proven particularly advantageous in the present invention to adapt an outer tooth flank contour 11.1, 11.2 of the tooth segments 5 and an inner tooth flank contour 12.1 and 12.2 of the inner toothing system 15 to the contour or the course of the logarithmic spiral Ln as a function of a constant rising angle α. Here, both tooth flank contours 11.1, 11.2 and 12.1 and 12.2 are mirror symmetrical with respect to an axis center A.

Independently of the selected radius r, each ray, starting from the gear set axis M of the coaxial gear set R, intersects the tooth flank contour 11.1 or 11.2 and 12.1 or 12.2 at an identical angle α. The angle α can be selected freely or is defined by the function of the selected logarithmic spiral Ln.

If the tooth segments 5 are displaced along the logarithmic spiral Ln with their tooth flanks 11.1 and 11.2 with respect to the tooth flanks 12.1 and 12.2, respectively, of the internal toothing system 15, flank regions of the same rising angle α always lie opposite one another. There is therefore always the optimum tooth face contact. Smallest curvature differences in the region of the tooth flank are compensated for elastically, even in the case of very low forces, in the case of correspondingly displaced tooth flanks of the tooth segments 8 with respect to the inner toothing system 15. One can therefore talk of surface contact in the complete engagement region.

This means that no linear rolling takes place, but rather flat displacement between the tooth segment 5 and the internal toothing system 15 of the internal gear 1, which ensures very high moment transmission with wear which is as low as possible.

Furthermore, it has proven advantageous in the present invention that an internal gear root fillet 16 which is adapted tangentially with a contour to the contour 12.1, 12.2 of the toothing system 13 or the internal toothing system 15 is formed between two adjacent toothing systems 13 in the region of the tooth root 14 of the internal gear internal toothing system 15.

Here, the curvature is less than a tip curve 17 of the tooth segment 5. The tip curve 17 of the tooth segment 5 is likewise adapted in a tangentially merging manner to the tooth flank contours 11.1, 11.2 of the tooth flanks 6. This ensures a jolt-free transition between the individual up and down movements of the tooth segments 5.

However, it is important in the present invention that, in order to transmit the greatest possible forces and moments, in particular in the region of a toothing system 13 of the internal gear 1, contact which is over as great an area as possible and is permanent is produced between a tooth flank 12.1 and 12.2 of the internal gear internal toothing system 15 and a tooth flank 11.1 and 11.2, respectively, of the tooth segment 5, almost as far as the internal gear root fillet 16.

In addition, on account of the jolt-free stroke movement of the tooth segments 5, a positive return means of the tooth segment 5 can be omitted in a design of this type of the tooth flank contour 11.1, 11.2 and contour 12.1, 12.2 of the internal toothing system 15 of the internal gear 1, and the pushing back of the tooth segments 5 takes place automatically as a result of the design of the tooth flank contour.

The invention claimed is:

1. A coaxial gear set comprising a drive element, an output element, a step-up ratio and a transmission of a drive moment between the drive element and the output element via a plurality of radial movable tooth segments, wherein an outer tooth flank contour of a tooth flank of the tooth segments and/or a flank contour of a toothing system of an internal toothing system of an internal gear, in relation to a gear set axis (M), have/has a spiral tooth contour which makes surface contact possible in an engagement region, wherein the spiral tooth contour is a logarithmic spiral.

2. The coaxial gear set as claimed in claim 1, wherein, independently of a selected radius to the gear set axis (M), the outer tooth flank contour of the flank region of the tooth segment and the flank contour of the internal toothing system of the toothing system of the internal gear correspond to a common logarithmic spiral (Ln) with a rising angle (α).

3. The coaxial gear set as claimed in claim 2, wherein, during the stroke movement of the tooth segments, there is a uniform load distribution, as the teeth are displaced along the logarithmic spiral (Ln) and those tooth flanks of the tooth segments and the internal gear internal toothing system which are in contact with one another always have the same rising angle (α).

4. The coaxial gear set as claimed in claim 2, wherein the rising angle (α) is between 15° and 45°.

5. The coaxial gear set as claimed in claim 2, wherein the outer tooth flank contour of the tooth segments and/or the flank contour of the internal toothing system is corrected in accordance with the tilting behavior of the tooth segment under loading.

6. The coaxial gear set as claimed in claim 1, wherein the outer tooth flank contour on one side of an axis center (A) is configured to be symmetrical to the adjacent outer tooth flank contour of the tooth flank and the internal toothing system of the internal gear, respectively.

7. The coaxial gear set as claimed in claim 1, wherein the tooth segments have a tip curve.

8. The coaxial gear set as claimed in claim 7, wherein the tip curve of each of the tooth segments bear tangentially against the tooth flank and merges into the outer tooth flank contour of the respective tooth segment.

9. The coaxial gear set as claimed in claim 1, wherein an internal gear root fillet is provided between the respective flank contours of the internal toothing system of the internal gear, wherein the internal gear root fillet is less curved than a tip curve of the tooth segments.

10. The coaxial gear set as claimed in claim 9, wherein a jolt-free stroke movement and automatic pushing back of the tooth segments out of the internal toothing system results from the internal gear root fillet of the internal toothing system in contact with the tip curve of the tooth segments.

11. The coaxial gear set as claimed in claim 1, wherein the outer tooth flank contour of the tooth segments is adapted on an outside surface to the flank contour of the internal toothing system of the internal gear by the logarithmic spiral (Ln) during the engagement of the tooth flank into a tooth root or into a flank contour of the internal toothing system of the internal gear, and surface contact is ensured between the outer tooth flank contour of the tooth segment and the tooth flank of the toothing system of the internal gear.

* * * * *